US011843696B2

(12) United States Patent
Unger et al.

(10) Patent No.: US 11,843,696 B2
(45) Date of Patent: Dec. 12, 2023

(54) OPCODELESS COMPUTING AND MULTI-PATH ENCRYPTION SYSTEMS, METHODS, AND DEVICES

(71) Applicant: Kara Partners LLC, Midlothian, VA (US)

(72) Inventors: Quinn Unger, Rosscarbery (IE); Giovanni Viscardi, Richmond, VA (US)

(73) Assignee: Kara Partners LLC, Midlothian, VA (US)

( * ) Notice: Subject to any disclaimer, the term of this patent is extended or adjusted under 35 U.S.C. 154(b) by 0 days.

(21) Appl. No.: 16/999,383

(22) Filed: Aug. 21, 2020

(65) Prior Publication Data
US 2022/0060320 A1 Feb. 24, 2022

(51) Int. Cl.
*H04L 9/08* (2006.01)
*G06F 11/10* (2006.01)
*H04L 9/30* (2006.01)

(52) U.S. Cl.
CPC .......... *H04L 9/088* (2013.01); *G06F 11/1076* (2013.01); *H04L 9/08* (2013.01); *H04L 9/30* (2013.01)

(58) Field of Classification Search
CPC ... H04L 9/088; H04L 9/08; H04L 9/30; G06F 11/1076
See application file for complete search history.

(56) References Cited

U.S. PATENT DOCUMENTS

| | | | |
|---|---|---|---|
| 9,374,370 B1 * | 6/2016 | Bent | H04L 63/061 |
| 10,148,430 B1 * | 12/2018 | Roth | H04L 9/0891 |
| 2003/0131251 A1 * | 7/2003 | Fetkovich | H04N 21/25833 |
| | | | 713/193 |
| 2005/0152305 A1 * | 7/2005 | Ji | H04L 63/0428 |
| | | | 370/328 |
| 2005/0235163 A1 * | 10/2005 | Forlenza | G06F 21/6209 |
| | | | 713/193 |
| 2005/0265546 A1 * | 12/2005 | Suzuki | H04L 9/0662 |
| | | | 380/44 |
| 2008/0019517 A1 * | 1/2008 | Munguia | H04L 9/088 |
| | | | 380/210 |
| 2013/0163753 A1 * | 6/2013 | MacMillan | H04L 9/0861 |
| | | | 380/44 |
| 2014/0344580 A1 * | 11/2014 | Von Mueller | H04L 9/3226 |
| | | | 713/172 |

* cited by examiner

*Primary Examiner* — Vance M Little
*Assistant Examiner* — Howard H. Louie
(74) *Attorney, Agent, or Firm* — TROUTMAN PEPPER HAMILTON SANDERS LLP; Dustin B. Weeks; Stephanie J. Remy (57) ABSTRACT

A system including: a storage; and a processor configured to: receive a data packet; and process the data packet without an instruction input to perform a definite task. The data packet may be encrypted. The processor may be configured to process the data packet based on a decryption mechanism required to decrypt the data packet.

19 Claims, 5 Drawing Sheets

OPCODELESS COMPUTING AND MULTI-PATH ENCRYPTION SYSTEMS, METHODS, AND DEVICES

FIELD

Embodiments of the present disclosure generally relate to opcodeless computing, multi-path encryption, and/or machine learning and, more particularly, to systems, methods, and devices for opcodeless computing and multi-path encryption.

BACKGROUND

Traditionally, computers perform operations under the direction of a linear sequence of instructions, which may be supplied in the form of a computer program. The instructions traditionally utilize operation codes (opcodes) such as ADD, MOVE, PUSH, AND, OR, SUBTRACT, and MULTIPLY, among others. These opcodes explicitly dictate what data elements to use and what to do with said data elements. For example, and opcode may instruct a process to add the value in Register 4 with the value in Register 6, and store the result in Register 7. During the execution of a computer program, the instructions are supplied to a decoder within a processor, which decodes the instructions, including the opcode, and executes the instructions.

However, in the design of a communication protocol, isolating instructions from data makes it easier for a bad actor to filter and/or block specific communications. Thus, there is a need for a communication protocol that can limit or eliminate the use of opcodes. Furthermore, it is beneficial for any communication protocol to provide encryption mechanisms. Aspects of the present disclosure relate to these and other features.

SUMMARY

According to an embodiment, there is provided a system including: a storage; and a processor configured to: receive a data packet; and process the data packet without an instruction input to perform a definite task.

The processor may not process operation codes. The data packet may be encrypted. The processor may be configured to process the data packet based on a decryption mechanism required to decrypt the data packet.

The processor may be further configured to: attempt to decrypt the data packet utilizing a plurality of decryption mechanisms to identify a required decryption mechanism, each of the plurality of decryption mechanisms being associated with a particular function, and process the data packet in accordance with the particular function associated with the required decryption mechanism.

According to an embodiment, there is provided a processing method including: receiving a data packet; and processing the data packet without an instruction input to perform a definite task.

The method may be performed by a processor that does not process operation codes. The data packet may be encrypted. Processing the data packet may be based on a decryption mechanism required to decrypt the data packet.

The method may further include attempting to decrypt the data packet utilizing a plurality of decryption mechanisms to identify a required decryption mechanism, each of the plurality of decryption mechanisms being associated with a particular function, and processing the data packet in accordance with the particular function associated with the required decryption mechanism.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an" and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

To facilitate an understanding of the principles and features of the disclosure, various illustrative embodiments are explained below. The present disclosure, however, is not so limited, and can be applicable in other contexts.

Opcodeless Computing

As discussed above, traditionally, computers perform operations on data based on separate opcodes such as ADD, MOVE, PUSH, AND, OR, SUBTRACT, and MULTIPLY, among others. However, these are merely examples, and opcodes may generally be thought of as any operation instruction. Aspects of this disclosure may be especially relevant for advanced compound instructions with larger data sets and/or traditional operation codes. Opcodes may explicitly dictate what data elements to use and what to do with said data elements. However, having such explicit instructions renders it much easier for someone with unauthorized access to a system to follow the system's operations and/or filter out or block specific communications or operations. Accordingly, aspects of the present disclosure are directed to opcodeless computing.

In an embodiment, a system associates a method of encryption/decryption of a data packet with a core function. When the system receives a packet, it may attempt to simultaneously decrypt the data packet utilizing a plurality of decryption mechanisms (e.g., a plurality of different keys), each decryption mechanisms being associated with a different system function. Only a single one of the decryption mechanisms would successfully decrypt the data packet, thereby identifying the function for the system to perform. In an embodiment, the decryption mechanisms may be updated and/or rotated overtime. For example, a set of decryption keys may correspond to the decryption mechanisms. The decryption keys may be generated using a seeded algorithm. After every eighth use of the set of decryption keys, the seeded algorithm may generate a new set of decryption keys for the opcodeless computing. In some cases, the decryption mechanisms may be distinct decryption standards (e.g., using distinct functions and not merely distinct keys).

Figure 1:
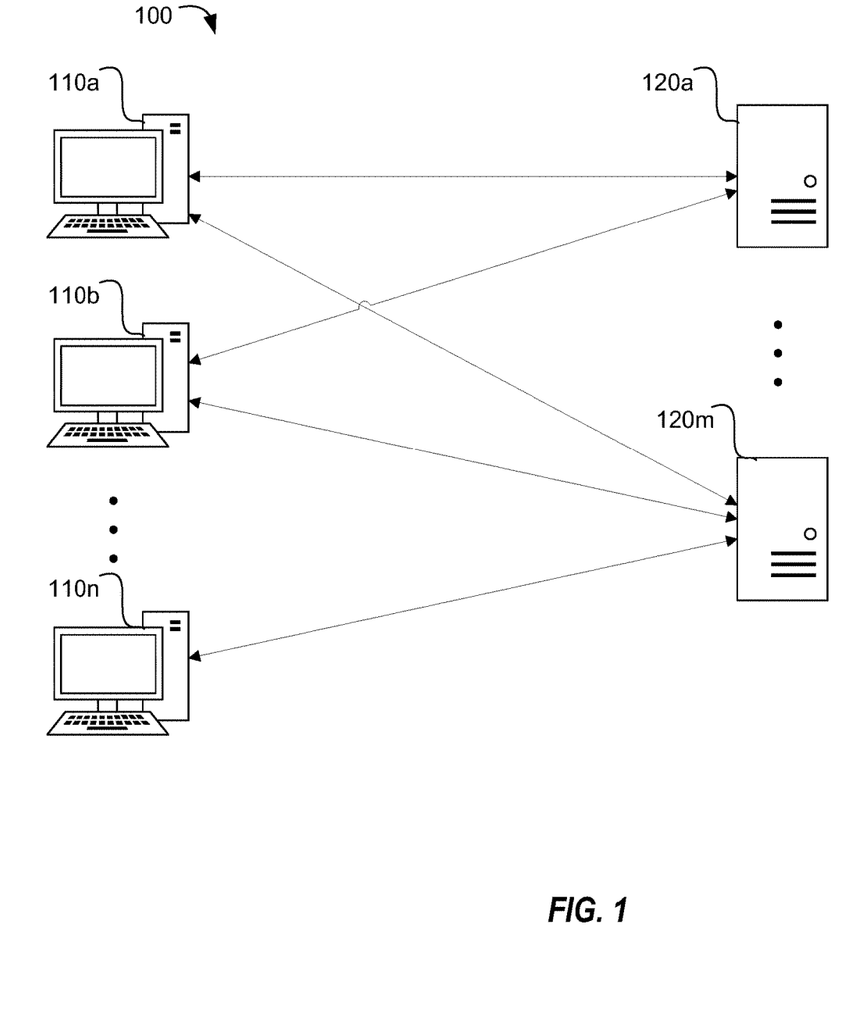
FIG. 1 is an example environment for implementing aspects of the present disclosure.

Aspects of the present disclosure will now be discussed with reference to various figures. FIG. 1 illustrates an example environment 100 in which aspects of the present disclosure may be implemented. Environment 100 includes a plurality of systems 110a-110n (system 110) and one or more servers 120a-120m (e.g., server 120). The systems 110 and servers 120 may be implemented using one or more features of computer architecture 600 described below with reference to FIG. 6. System 110 may communicate with one or more of servers 120. Likewise, Server 120 may communicate with one or more of systems 110. For example, server 120 may be a banking server 120 and system 110 may be user device 110 of a customer of the bank. As another example, server 120 may be a business server 120 and system 110 may be employee devices for remote working.

System 110 and server 120 may be configured to communicate utilizing opcodeless messaging. For ease of description, system 110 will be discussed as receiving encrypted data packets, and server 120 will be discussed as transmitting encrypted data packets, but this is merely an example. As would be understood by one of ordinary skill in light of the present disclosure, the rolls of system 110 and server 120 may be reversed. Moreover, one of ordinary skill in light of the present disclosure will recognize that various aspects of the present disclosure may be implemented in alternative environments and/or with alternative devices.

System 110 and server 120 may utilize synched encryption/decryption methods associated with specific functions of system 110 and/or server 120. For example, system 110 and server 120 may use a set of encryption/decryption keys that are respectively mapped to different functions. When server 120 sends a data packet to system 110, server 120 may encrypt the data packet and metadata using the encryption key corresponding to the desired function to be executed by system 110. Server 120 then sends the encrypted data packet to system 110. System 110 receives the encrypted data packet and attempts to decrypt the data packet utilizing all decryption keys (e.g., simultaneously and/or consecutively). By referencing the metadata (e.g., checksum), system 110 can identify which decryption key successfully decrypts the data packet and can execute the corresponding function.

Figure 2:
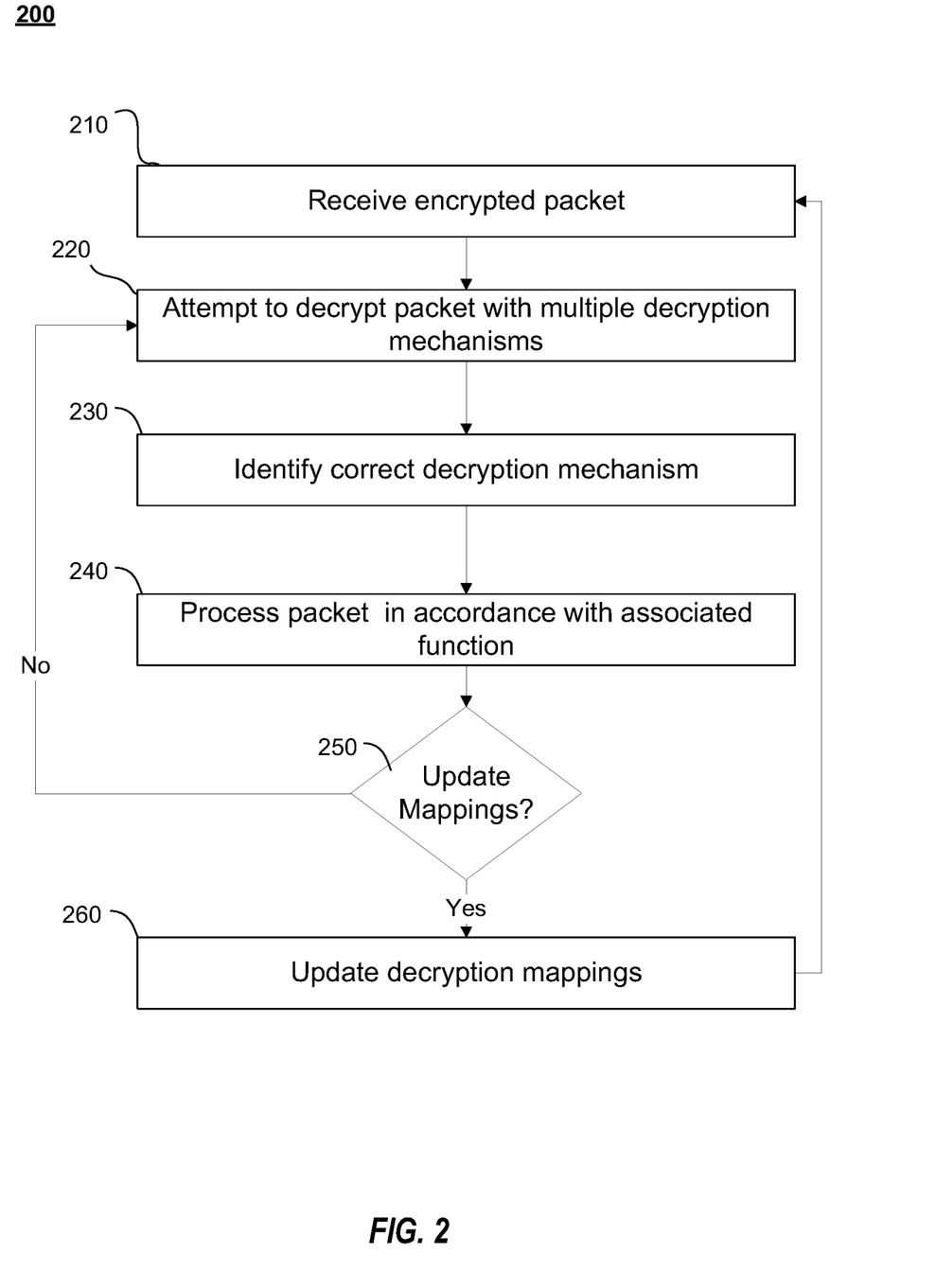
FIG. 2 is a flowchart illustrating an opcodeless computing method according to aspects of the present disclosure.

FIG. 2 is a flowchart 200 illustrating an opcodeless computing method according to an embodiment. The method may be performed by a system (e.g., system 110). Referring to FIG. 2, a system 110 receives 210 an encrypted packet (e.g., from server 120). The encrypted packet may include data and/or header information, such as metadata associated with the data (e.g., a destination address and port or error detection/correction information). The system 110 attempts to decrypt 220 the encrypted packet utilizing a plurality of decryption mechanisms corresponding to specific system 110 functions. For example, system 110 may store a plurality of encryption keys. The decryption 220 may be performed in parallel for at least two of the decryption mechanisms.

Next, the system 110 identifies 230 a correct decryption mechanism. For example, the encrypted packet may include one or more of a checksum and/or some other error detection or correcting code (individually or collectively "EDC"). As would be understood by one of ordinary skill in light of the present disclosure, only the correct decryption mechanism would be able to decrypt the data packet while satisfying the EDC. The system 110 then processes 240 the data packet in accordance with the system 110 function associated with the correct decryption mechanism.

After processing 240 the data packet, the system 110 may determine 250 whether the decryption mappings should be updated. For example, the decryption mappings may be updated after a predetermined number of packets utilizing a set of decryption mappings are transmitted (e.g., after every eighth packet). In another example, the decryption mappings may be updated at predetermined intervals, such as every minutely, hourly, or weekly. In some cases, the decryption mappings may be updated in response to an explicit command (e.g., within the data packet) or based on the correct decryption mechanism. In certain cases, the system may update its decryption mappings in response to determining that the current mappings do not decrypt the packet (e.g., speculatively). In other words, the update may be triggered by one party to the communication (e.g., when one party updates its mappings, the other must as well to continue the communication). Accordingly, the update rate can be dynamically controlled based on, for example, processor requirements (e.g., usage rates and availability) and/or security requirements (e.g., a higher update rate when handling with more sensitive information).

If it is determined that the mappings should not be updated (250—No), the system 110 waits to receive 210 a next encrypted packet. If it is determined that the mappings should be updated (250—Yes), the system 110 updates 260 the decryption mappings. In an example, updating 260 the decryption mappings may include remapping (e.g., pseudo-randomly) assignments of the decryption mechanisms to functions of the system 110. In an example, updating 260 the decryption mappings may involve deriving new decryption methods. For example, in a case where the decryption mechanisms correspond to respective decryption keys, system 110 may generate a new set of decryption keys for future communications. The keys may be generated using a seeded key-generation algorithm.

In some cases, the encryption protocol described above as a replacement to opcodes could be used merely for network encryption or as a replacement to certain opcodes. For example, if the multi-path encryption merely provides an encryption layer, an encrypted packet may include an opcode. After the encrypted packet is decrypted (e.g., 220), the packet may be processed normally (e.g., identifying the opcode included in the decrypted packet and processing the packet in accordance with the opcode). In some instances, multi-path encryption may replace certain opcodes (e.g., identification of decompression protocols) but not others (e.g., TCP protocols), and the encrypted packet may wrap or be wrapped by these protocols as needed by various systems.

Figure 3:
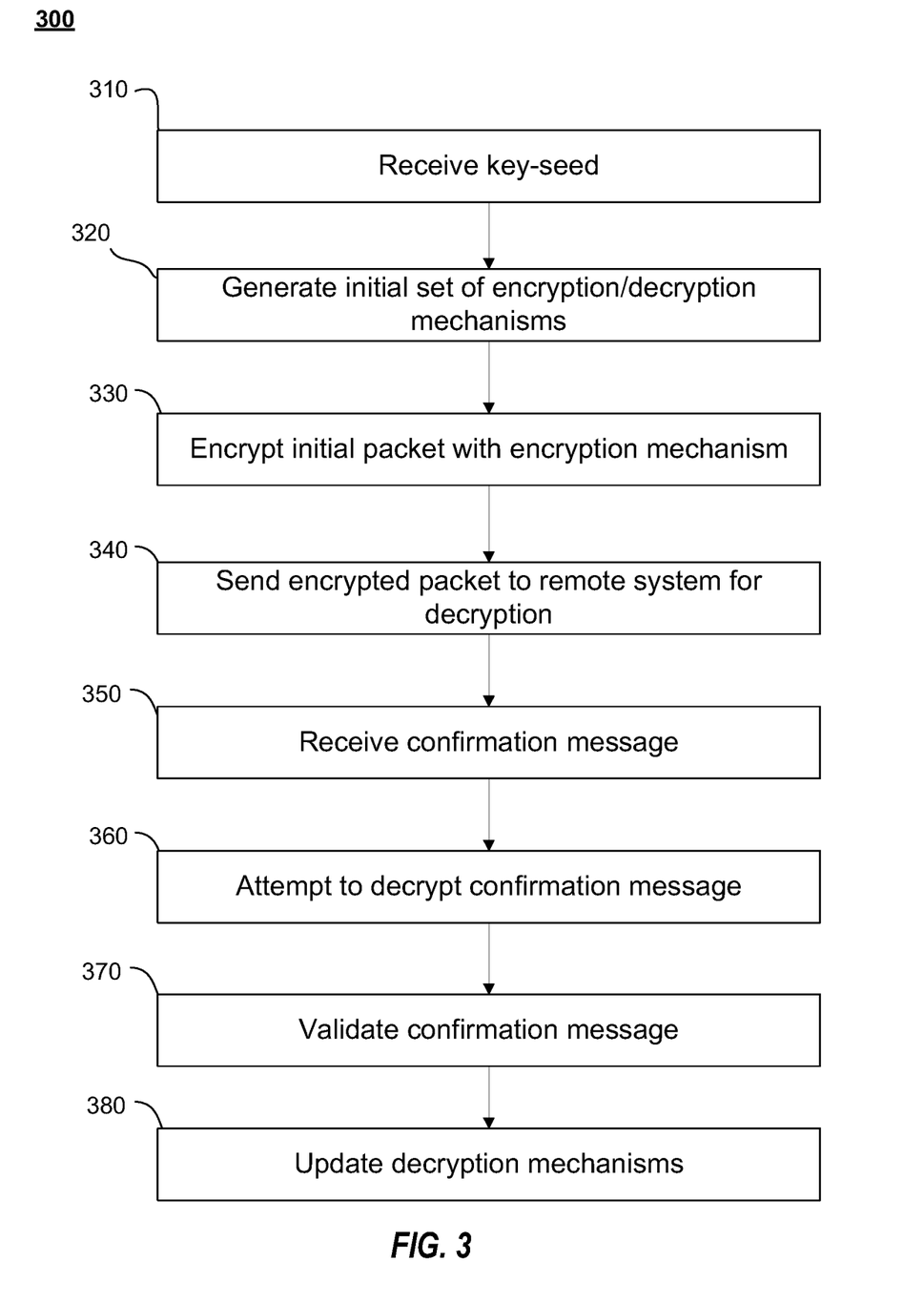
FIG. 3 is a flowchart illustrating initialization of an opcodeless computing method according to aspects of the present disclosure.

FIG. 3 is a flowchart 300 illustrating initialization of an opcodeless computing method according to an embodiment. The method may be performed by a system (e.g., system 110). The system 110 may have stored a key-creation algorithm and/or a burner key repository. In some cases, the key-creation and/or processing algorithms may be implemented in hardware circuits. Referring to FIG. 3, a system 110 receives 310 a key-seed (e.g., a user pin or password). The user pin can be selected by a user of the system 110. The system 110 generates 320 a plurality of encryption/decryption mechanisms based on the user pin. For example, system 110 may generate an initial set of encryption/decryption keys for system 110 verification. The system 110 encrypts 330 an initial packet with an encryption mechanism from the plurality of encryption mechanisms. For example, the system 110 may encrypt 330 the initial packet with one encryption key of the initial set of encryption/decryption keys. The encryption mechanism may be selected pseudo-randomly from among the plurality of initial encryption mechanisms.

The system 110 sends 340 the encrypted packet to a remote system (e.g., server 120). The user pin can be shared with the remote system so that the system 110 and remote system can have coordinated encryption/decryption keys/methods. In some cases, the sharing may be done through a separate encrypted protocol (e.g., an initial key designation) or may be manual entered into each system. The remote system attempts to decrypt the packet utilizing each of the set of decryption mechanisms. After the remote system correctly decrypts the packet, the system 110 receives 350 a confirmation message from the remote system. The confirmation message may be, as non-limiting examples, a hash of the initial message from the system 110.

The system 110 attempts to decrypt 360 the confirmation message (e.g., by utilizing each of the set of the decryption mechanisms) and validates 370 the confirmation message. The system 110 then updates 380 the decryption mechanisms based on the key-seed item. For example, system 110 may generate a next (i.e., current) set of encryption/decryption keys using the key-seed for communication with the remote system. Data can now be exchanged between the system 110 and the remote system. In some cases, the system 110 may also map 390 the current set of decryption mechanisms to functions of the system 110. In this way, the system 110 and remote system may communicate using an opcodeless protocol as described above with reference to FIGS. 1 and 2.

Figure 4:
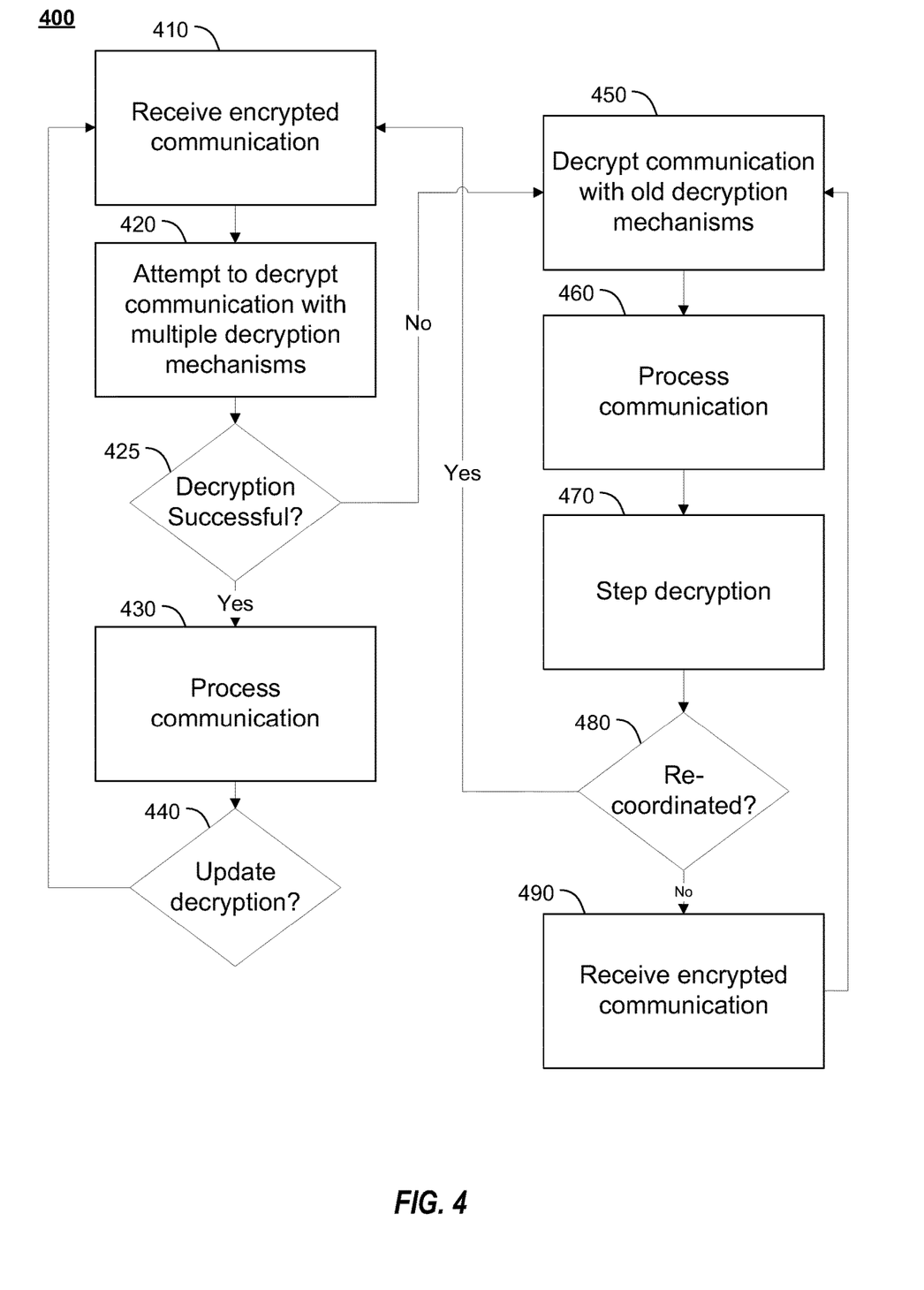
FIG. 4 is a flowchart illustrating re-coordination between two communicating systems according to aspects of the present disclosure.

FIG. 4 is a flowchart 400 illustrating re-coordination between two communicating systems. The method may be performed by a system (e.g., server 120) in communication with one or more remote systems (e.g., systems 110). Server 120 may communicate with a plurality of remote systems using coordinated decryption mappings. For example, server 120 may communicate with a plurality of user devices for a single user (e.g., a laptop, a desktop, and a mobile phone) and may use coordinated mappings for all user devices of the single user. Server 120 may maintain a historical list of decryption/encryption mechanisms (e.g., keys). While one or more of the user devices are not communicating with the server 120, they may not update their stored mechanisms with the remaining devices. Accordingly, server 120 may re-coordinate with the user devices when they reconnect in order to update the user device's mechanisms.

For example, as shown in FIG. 4, server 120 can receive 410 an encrypted communication packet from system 110. The encrypted packet may include data and/or header information, such as metadata associated with the data (e.g., a destination address and port or error detection/correction information). The server 120 attempts to decrypt 420 the encrypted packet utilizing a plurality of decryption mechanisms. For example, server 120 may store a plurality of encryption keys. The decryption 420 may be performed in parallel for at least two of the decryption mechanisms. If the decryption is successful (425—Yes), server 120 processes 430 the communication packet. Server 120 may then optionally update 440 decryption before receiving 410 a next communication packet.

Meanwhile, if the communication cannot be decrypted using the decryption mechanisms (425—No), server 120 may attempt to decrypt 450 the communication using old decryption mechanisms. For example, as discussed above, server 120 may store may maintain a historical list of decryption/encryption mechanisms (e.g., keys). The historical listing may be grouped by user, device, device group, and/or user group as non-limiting examples. Server 120 can then process 460 the packet.

Server 120 can step 470 the decryption mechanism set from the historically effective set. Server 120 may notify system 110 of stepping the decryption. For example, server 120 may encrypt a response message to the packet using the stepped key. When received, system 110 would attempt to decrypt the message and, if unable using its current mechanisms, prospectively generate a next set of decryption keys.

Once the stepped decryption are re-coordinated (480—Yes) (i.e., once system 110 has been updated to the current key set of server 120), receives a next packet 410 and proceeds ordinarily. If the stepped decryption is still historic (480—No), server 120 will continue using old decryption mechanisms after receiving 490 a next communication from system 110.

As an example, consider server 120 maintaining a historic list of 20 most recent sets of decryption keys from 1 (current) to 20. When server 120 receives a communication from system 110, server 120 initially tries decryption key set 1. If this does not work, server 120 may attempt decryption using historical key sets 2-20. In some cases, server 120 may attempt decryption starting in set 2, working from most current to most historic, but this is merely example. In an example case, key set 3 works to decrypt the packet. Server 120 processes the decrypted packet and steps the decryption to key set 2, for example, by responding to the packet with a confirmation encrypted using keyset 2.

System 110 receives the confirmation, determines it cannot be decrypted using key set 3 (its current keyset) and then steps to a next key set (e.g., generating a next key set that corresponds to key set 2 of server 120). Server 120 will receive a next communication that can be decrypted using key set 2. Server 120 processes the decrypted packet and steps the decryption to key set 1, for example, by responding to the packet with a confirmation encrypted using keyset 1. System 110 receives the confirmation, determines it cannot be decrypted using key set 2 (its current keyset) and then steps to a next key set (e.g., generating a next key set that corresponds to key set 1 of server 120). System 110 will then be caught up to the current key set of server 120 and the key updating may be performed normally thereafter.

Although the examples above are generally described with stepping the decryption keys after each communication, these are merely examples. In some cases, an update rate for a lagging system 110 may be accelerated until it is re-coordinated. Additionally or alternatively, in some cases, an update rate for current systems 110 may be slowed until a lagging system 110 is re-coordinated.

Further, while the terms "packet," "communication," and/or "data packet" has been used in the foregoing, one of ordinary skill in light of the present disclosure would recognize that various data structures that may not be traditionally thought of as a "packet" may be utilized without departing from the scope of the present disclosure.

Example Computer Architecture

Figure 5:
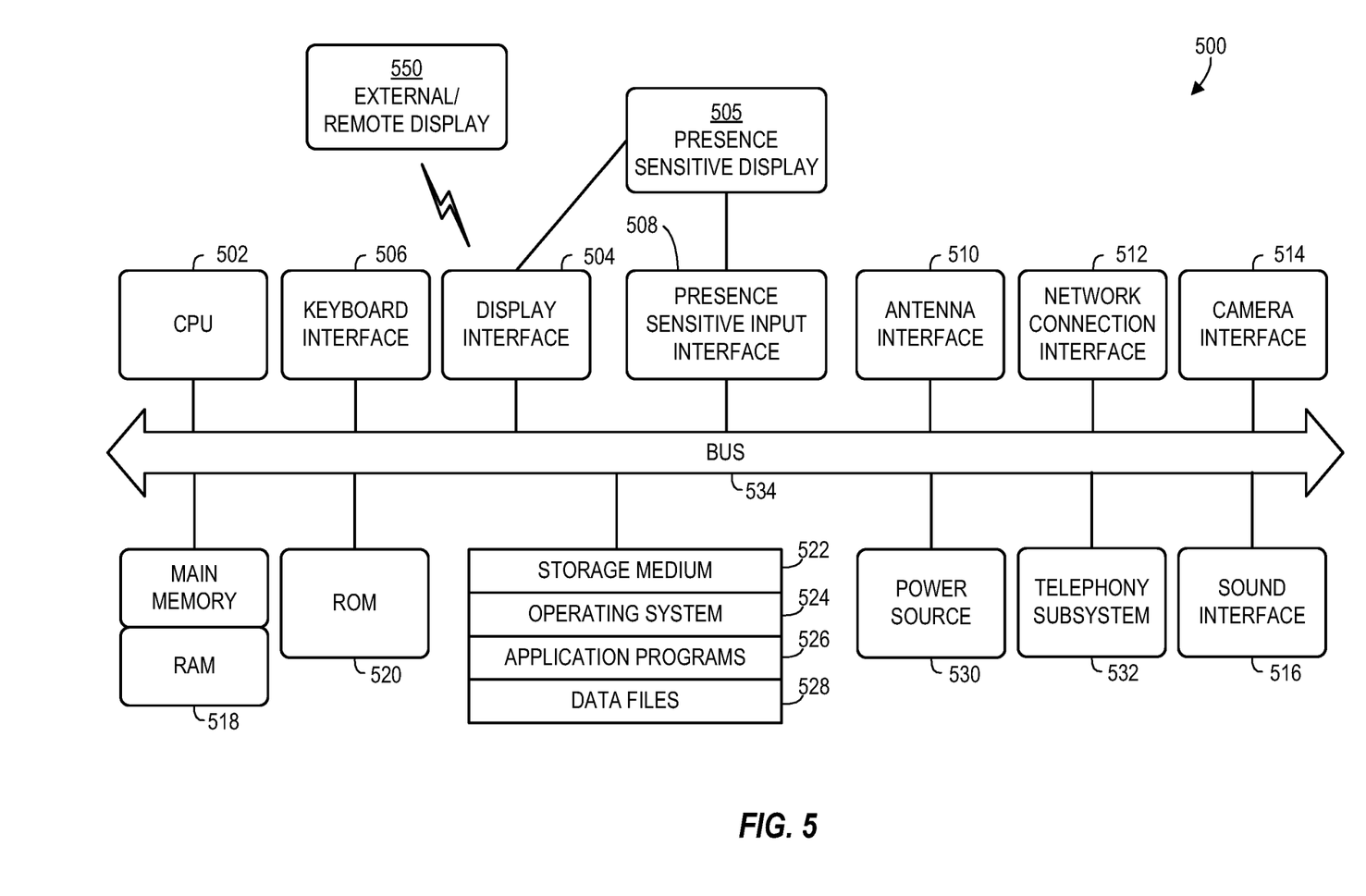
FIG. 5 is a block diagram of an illustrative computer system architecture according to aspects of the present disclosure.

FIG. 5 is a block diagram of an illustrative computer system architecture 500, according to an example implementation. As non-limiting examples, system(s) 110 and server(s) 120, may be implemented using one or more elements from the computer system architecture 500. It will be understood that the computing device architecture 500 is provided for example purposes only and does not limit the scope of the various implementations of the present disclosed systems, methods, and computer-readable mediums.

The computing device architecture 500 of FIG. 5 includes a central processing unit (CPU) 502, where computer instructions are processed, and a display interface 504 that acts as a communication interface and provides functions for rendering video, graphics, images, and texts on the display. In certain example implementations of the disclosed technology, the display interface 504 may be directly connected to a local display, such as a touch-screen display associated with a mobile computing device. In another example implementation, the display interface 504 may be configured for providing data, images, and other information for an external/remote display 550 that is not necessarily physically connected to the mobile computing device. For example, a desktop monitor may be used for mirroring graphics and other information that is presented on a mobile computing device. In certain example implementations, the display interface 504 may wirelessly communicate, for example, via a Wi-Fi channel or other available network connection interface 512 to the external/remote display 550.

In an example implementation, the network connection interface 512 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 504 may be operatively coupled to a local display, such as a touch-screen display associated with a mobile device. In another example, the display interface 504 may be configured to provide video, graphics, images, text, other information, or any combination thereof for an external/remote display 550 that is not necessarily connected to the mobile computing device. In one example, a desktop monitor may be used for mirroring or extending graphical information that may be presented on a mobile device. In another example, the display interface 504 may wirelessly communicate, for example, via the network connection interface 512 such as a Wi-Fi transceiver to the external/remote display 550.

The computing device architecture 500 may include a keyboard interface 506 that provides a communication interface to a keyboard. In one example implementation, the computing device architecture 500 may include a presence-sensitive display interface 508 for connecting to a presence-sensitive display 505. According to certain example implementations of the disclosed technology, the presence-sensitive display interface 508 may provide a communication interface to various devices such as a pointing device, a touch screen, a depth camera, etc. which may or may not be associated with a display.

The computing device architecture 500 may be configured to use an input device via one or more of input/output interfaces (for example, the keyboard interface 506, the display interface 504, the presence sensitive display interface 508, network connection interface 512, camera interface 514, sound interface 516, etc.) to allow a user to capture information into the computing device architecture 500. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 500 or may be a separate device. For example, the input device may be an accelerometer, a magnetometer, a digital camera, a microphone, and an optical sensor.

Example implementations of the computing device architecture 500 may include an antenna interface 510 that provides a communication interface to an antenna; a network connection interface 512 that provides a communication interface to a network. As mentioned above, the display interface 504 may be in communication with the network connection interface 512, for example, to provide information for display on a remote display that is not directly connected or attached to the system. In certain implementations, a camera interface 514 is provided that acts as a communication interface and provides functions for capturing digital images from a camera. In certain implementations, a sound interface 516 is provided as a communication interface for converting sound into electrical signals using a microphone and for converting electrical signals into sound using a speaker. According to example implementations, a random-access memory (RAM) 518 is provided, where computer instructions and data may be stored in a volatile memory device for processing by the CPU 502.

According to an example implementation, the computing device architecture 500 includes a read-only memory (ROM) 520 where invariant low-level system code or data for basic system functions such as basic input and output (I/O), startup, or reception of keystrokes from a keyboard are stored in a non-volatile memory device. According to an example implementation, the computing device architecture 500 includes a storage medium 522 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 (including, for example, a web browser application, a widget or gadget engine, and or other applications, as necessary) and data files 528 are stored. According to an example implementation, the computing device architecture 500 includes a power source 530 that provides an appropriate alternating current (AC) or direct current (DC) to power components.

According to an example implementation, the computing device architecture 500 includes a telephony subsystem 532 that allows the device 500 to transmit and receive sound over a telephone network. The constituent devices and the CPU 502 communicate with each other over a bus 534.

According to an example implementation, the CPU 502 has appropriate structure to be a computer processor. In one arrangement, the CPU 502 may include more than one processing unit. The RAM 518 interfaces with the computer bus 534 to provide quick RAM storage to the CPU 502 during the execution of software programs such as the operating system application programs, and device drivers. More specifically, the CPU 502 loads computer-executable process steps from the storage medium 522 or other media into a field of the RAM 518 to execute software programs. Data may be stored in the RAM 518, where the data may be accessed by the computer CPU 502 during execution.

The storage medium 622 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 622, which may include a machine-readable storage medium.

According to one example implementation, the term computing device, as used herein, may be a CPU, or conceptualized as a CPU (for example, the CPU 602 of FIG. 6). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

An embodiment of the present disclosure may be implemented according to at least the following:

Clause 1: A system including: a storage; and a processor configured to: receive a data packet; and process the data packet without an instruction input to perform a definite task.

Clause 2: The system of clause 1, wherein the processor does not process operation codes.

Clause 3: The system of clauses 1 or 2, wherein the data packet is encrypted, and the processor is configured to process the data packet based on a decryption mechanism required to decrypt the data packet.

Clause 4: The system of clause 3, wherein the processor is further configured to: attempt to decrypt the data packet utilizing a plurality of decryption mechanisms to identify a required decryption mechanism, each of the plurality of decryption mechanisms being associated with a particular function, and process the data packet in accordance with the particular function associated with the required decryption mechanism.

Clause 5: The system of clause 4, wherein the processor is further configured to identify the required decryption mechanism based on verification of the attempted decryption utilizing metadata included with the data packet.

Clause 6: The system of clause 5, wherein the metadata includes error detecting code.

Clause 7: The system of clauses 5 of 6, wherein the metadata includes an error-correcting code.

Clause 8: The system of any of clauses 4-7, wherein each decryption mechanism of the plurality of decryption mechanisms corresponds to a respected decryption key.

Clause 9: The system of clause 8, wherein the storage has stored thereon one or more key-creation algorithms, and the processor is further configured to generate the respective decryption keys using the key-creation algorithm.

Clause 10: The system of clause 9, wherein the processor is further configured to generate the respective decryption keys based on a user-inputted code.

Clause 11: The system of any of clauses 4-10, wherein the processor is further configured to update associations of decryption mechanisms to particular functions.

Clause 12: The system of clause 11, wherein updating the associations includes reassigning decryption mechanisms of the plurality of decryption mechanisms to different functions.

Clause 13: The system of clauses 11 or 12, wherein each decryption mechanism of the plurality of decryption mechanisms corresponds to a respected decryption key, and the processor is configured to generate new decryption keys to replace the respective decryption keys.

Clause 14: The system of any of clauses 11-13, wherein the processor is configured to update associations of decryption mechanisms to particular functions based on a number of uses of a current set of decryption mechanisms.

Clause 15: The system of any of clauses 11-14, wherein the processor is configured to update associations of decryption mechanisms to particular functions on a periodic basis.

Clause 16: The system of any of clauses 11-15, wherein the processor is configured to update associations of decryption mechanisms in response to use of a particular decryption mechanism of the plurality of decryption mechanisms.

Clause 17: A processing method including: receiving a data packet; and processing the data packet without an instruction input to perform a definite task.

Clause 18: The method of clause 17 performed by a processor that does not process operation codes.

Clause 19: The method of clauses 17 or 18, wherein the data packet is encrypted.

Clause 20: The method of clause 19, wherein processing the data packet is based on a decryption mechanism required to decrypt the data packet.

Clause 21: The method of clause 19 or 20 further including: attempting to decrypt the data packet utilizing a plurality of decryption mechanisms to identify a required decryption mechanism, each of the plurality of decryption mechanisms being associated with a particular function, and processing the data packet in accordance with the particular function associated with the required decryption mechanism.

Clause 22: The method of clause 21 further including: identifying the required decryption mechanism based on verification of the attempted decryption utilizing metadata included with the data packet.

Clause 23: The method of clause 22, wherein the metadata includes error detecting code.

Clause 24: The method of clauses 22 or 23, wherein the metadata includes an error-correcting code.

Clause 25: The method of any of clauses 21-24, wherein each decryption mechanism of the plurality of decryption mechanisms corresponds to a respected decryption key.

Clause 26: The method of clause 25, further including: storing one or more key-creation algorithms; and generating the respective decryption keys using the key-creation algorithm.

Clause 27: The method of clause 26 further including generating the respective decryption keys based on a user-inputted code.

Clause 28: The method of any of clauses 21-27 further including updating the associations of decryption mechanisms to particular functions.

Clause 29: The method of clause 28, wherein updating the associations includes reassigning decryption mechanisms of the plurality of decryption mechanisms to different functions.

Clause 30: The method of clauses 28 or 29, wherein each decryption mechanism of the plurality of decryption mechanisms corresponds to a respected decryption key, and the method further includes generating new decryption keys to replace the respective decryption keys.

Clause 31: The method of any of clauses 28-30 further including updating associations of decryption mechanisms to particular functions based on a number of uses of a current set of decryption mechanisms.

Clause 32: The method of any of clauses 28-31 further including updating associations of decryption mechanisms to particular functions on a periodic basis.

Clause 33: The method of any of clauses 28-32 further including updating associations of decryption mechanisms in response to use of a particular decryption mechanism of the plurality of decryption mechanisms.

Clause 34: A system comprising a memory and a processor configured to execute a method according to any of clauses 17-33.

Clause 35: A non-transitory computer readable medium having stored thereon instructions for executing a method according to any of clauses 17-33.

In addition to this specification and the prepared drawings, this disclosure includes an appendix detailing the development of a tool in accordance with the present disclosure. It is intended solely for explanatory purposes and not in limitation.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A system comprising:
a storage; and
a hardware processor configured to:
receive a first encrypted data packet without receiving an explicit instruction to perform a definite task to the first data packet;

perform a first plurality of potential decryption mechanisms on the first data packet, wherein only a first potential decryption mechanism in the first plurality of potential decryption mechanisms is capable of successfully decrypting the first data packet;

receive a second encrypted data packet without receiving an explicit instruction to perform a definite task to the second data packet;

perform the first potential decryption mechanism on the second encrypted data packet;

if the first potential decryption mechanism is not capable of successfully decrypting the second encrypted data packet, generate a second plurality of potential decryption mechanisms based, at least in part, on the first potential decryption mechanism; and perform the second plurality of potential decryption mechanisms on the second data packet, wherein only a second potential decryption mechanism in the second plurality of potential decryption mechanisms is capable of successfully decrypting the second data packet.

2. The system of claim 1, wherein the processor is not operable to process operation codes.

3. The system of claim 1, wherein the first potential decryption mechanism is associated with a first system function, wherein the processor is further configured to:
process the first data packet in accordance with the first system function, the first system function being distinct from decryption of the first encrypted data packet and the first system function being distinct from determining an originating source of the first encrypted data packet.

4. The system of claim 3, wherein the processor is further configured to identify the first potential decryption mechanism utilizing metadata included with the first data packet.

5. The system of claim 4, wherein the metadata comprises at least one from among error detecting code and error-correcting code.

6. The system of claim 3, wherein each potential decryption mechanism of the first plurality of potential decryption mechanisms corresponds to a respective decryption key.

7. The system of claim 6, wherein
the storage has stored thereon one or more key-creation algorithms, and
the processor is further configured to generate the respective decryption keys using the one or more key-creation algorithm.

8. The system of claim 7, wherein the processor is further configured to generate the respective decryption keys based on an user-inputted code.

9. The system of claim 3, wherein the processor is further configured to update associations of the first plurality of potential decryption mechanisms to particular system functions.

10. The system of claim 9, wherein updating the associations comprises reassigning the first plurality of potential decryption mechanisms to different system functions.

11. The system of claim 9, wherein
each potential decryption mechanism of the first plurality of potential decryption mechanisms corresponds to a respective decryption key, and
the processor is configured to generate new decryption keys to replace the respective decryption keys.

12. The system of claim 9, wherein the processor is configured to update associations of first plurality of potential decryption mechanisms to particular system functions based on a number of uses of the first plurality of potential decryption mechanisms.

13. The system of claim 9, wherein the processor is configured to update associations of the first plurality of potential decryption mechanisms to particular functions on a periodic basis.

14. The system of claim 9, wherein the processor is configured to update associations of the first plurality of potential decryption mechanisms in response to use of a particular potential decryption mechanism of the first plurality of potential decryption mechanisms.

15. The system of claim 3, wherein the processor is further configured to perform the first plurality of potential decryption mechanisms substantially simultaneously.

16. The system of claim 1, wherein the first potential decryption mechanism is associated with a first system function, wherein the first system function is performed after the encrypted data packet is decrypted.

17. A processing method comprising:
receiving a first encrypted data packet without receiving an explicit instruction to perform a definite task to the first data packet;

performing a first plurality of potential decryption mechanisms on the data packet, wherein only a first potential decryption mechanism in the first plurality of potential decryption mechanisms is capable of successfully decrypting the data packet;

receiving a second encrypted data packet without receiving an explicit instruction to perform a definite task to the second data packet;

performing the first potential decryption mechanism on the second encrypted data packet;

if the first potential decryption mechanism is not capable of successfully decrypting the second encrypted data packet, generating a second plurality of potential decryption mechanisms based, at least in part, on the first potential decryption mechanism; and performing the second plurality of potential decryption mechanisms on the second data packet, wherein only a second potential decryption mechanism in the second plurality of potential decryption mechanisms is capable of successfully decrypting the second data packet.

18. The method of claim 17 performed by a processor that is not operable to process operation codes.

19. The method of claim 17, wherein the first potential decryption mechanism is associated with a first system function, the method further comprising:
processing the first data packet in accordance with the first system function, the first system function being distinct from decryption of the first encrypted data packet and the first system function being distinct from determining an originating source of the first encrypted data packet.

* * * * *